(12) United States Patent
Kadiyala et al.

(10) Patent No.: US 8,336,017 B2
(45) Date of Patent: Dec. 18, 2012

(54) ARCHITECTURE OPTIMIZER

(75) Inventors: Suresh Kadiyala, Cupertino, CA (US); Pius Ng, Hillsboro, OR (US); Anand Pandurangam, Sunnyvale, CA (US); Satish Padmanabhan, Sunnyvale, CA (US); James Player, Sunnyvale, CA (US)

(73) Assignee: Algotochip Corporation, Sunnyvale, CA (US)

( * ) Notice: Subject to any disclaimer, the term of this patent is extended or adjusted under 35 U.S.C. 154(b) by 0 days.

(21) Appl. No.: 13/008,900

(22) Filed: Jan. 19, 2011

(65) Prior Publication Data

US 2012/0185809 A1    Jul. 19, 2012

(51) Int. Cl.
  *G06F 9/455* (2006.01)
  *G06F 17/50* (2006.01)
(52) U.S. Cl. ........ 716/132; 716/133; 716/127; 716/109; 716/106; 716/134
(58) Field of Classification Search ................... 716/109, 716/127, 132, 133
  See application file for complete search history.

(56) References Cited

U.S. PATENT DOCUMENTS

2002/0019969 A1\* 2/2002 Hellestrand et al. .............. 716/5
2005/0204316 A1\* 9/2005 Nebel et al. ...................... 716/2

\* cited by examiner

*Primary Examiner* — Vuthe Siek
*Assistant Examiner* — Brian Ngo
(74) *Attorney, Agent, or Firm* — Tran & Associates

(57) ABSTRACT

Systems and methods are disclosed to automatically generate a custom integrated circuit (IC) described by a computer readable code or model. The IC has one or more timing and hardware constraints. The system extracts parameters defining the processor architecture from a static profile and a dynamic profile of the computer readable code; iteratively optimizes the processor architecture by changing one or more parameters of the architecture in a hierarchical manner until all timing and hardware constraints expressed as a cost function are met using an architecture optimizer (AO); and synthesizes the generated processor architecture into a computer readable description of the custom integrated circuit for semiconductor fabrication.

18 Claims, 4 Drawing Sheets

ARCHITECTURE OPTIMIZER

The present invention relates to a method for automatically generating an optimal architecture for a custom integrated circuit (IC) or an application-specific integrated circuit (ASIC).

BACKGROUND

Modern computer chips consist of one or more processors (CPUs) along with some shared and private caches and memories. In addition, all modern embedded computer chips contain multiple input-output units to move data in and out of the processor at a high speed. These chips typically go into devices such as the cell phones, all kinds of consumer and media devices like video and music players to modern television appliances, medical devices, automobiles, global positioning systems, communication devices, satellites, and remote sensing equipment.

The nature of computing varies widely between the various applications. Targeting the same chip for a wide variety of applications would result in a great mismatch between what is needed for an application versus what the chip offers. This usually results in either an under utilization of the processing resources in the chip, thus over-paying in terms of price and operational details, such as higher power consumption than needed, or insufficient processing power for the task at hand forcing the vendor to offer an inferior product to the market. ASICs or ASIPs bring in the customization capability to build a custom IC for a particular application at hand. But that is the one and only application the IC can perform. Designing an ASIP brings in all the advantages of power and a perfect match of the computation power, but is an expensive and time consuming solution. It takes dozens of man years, and several tens of millions of dollars to design an ASIP, that is used for just one application.

Normally the chip design process begins when algorithm designers specify all the functionality that the chip must perform. This is usually done in a language like C or Matlab. A team of chip specialists, tools engineers, verification engineers and firmware engineers then work many man-years to map the algorithm to a hardware chip and associated firmware. The team can use an off-the-shelf processor, which is proven but may have performance limitations because the standard architecture may not fit well with the algorithm.

The alternative is to design a custom architecture and custom hardware to achieve high performance for the desired algorithm. A computer architecture is a detailed specification of the computational, communication, and data storage elements (hardware) of a computer system, how those components interact (machine organization), and how they are controlled (instruction set). A machine's architecture determines which computations can be performed most efficiently, and which forms of data organization and program design will perform optimally.

The custom chip approach is a very expensive process and also fraught with risks from cost-overruns to technical problems. Developing cutting-edge custom IC designs introduces many issues that need to be resolved. Higher processing speeds have introduced conditions into the analog domain that were formerly purely digital in nature, such as multiple clock regions, increasingly complex clock multiplication and synchronization techniques, noise control, and high-speed I/O.

Another effect of increased design complexity is the additional number of production turns that may be needed to achieve a successful design. Yet another issue is the availability of skilled workers. The rapid growth in ASIC circuit design has coincided with a shortage of skilled IC engineers.

SUMMARY

In one aspect, systems and methods are disclosed to automatically generate a custom integrated circuit (IC) described by a computer readable code or model. The IC has one or more timing and hardware constraints. The system extracts parameters defining the processor architecture from a static profile and a dynamic profile of the computer readable code; iteratively optimizes the processor architecture by changing one or more parameters of the processor until all timing and hardware constraints expressed as a cost function are met using an architecture optimizer (AO); and synthesizes the generated processor architecture into a computer readable description of the custom integrated circuit for semiconductor fabrication.

Implementations of the above aspects may include one or more of the following. For a given set of applications/algorithms, an optimal computer system architecture can automatically be determined based on the various factors like performance, cost, and power. The optimal architecture consists of both the system level architecture and the processor level architecture. For the system level architecture, AO can automatically determine the amount of memory needed, the memory bandwidth to support, the number of DMA channels, clocks, and peripherals. For processor level architecture, the AO can automatically determine the need for and the amount of scalarity of the computation elements based on the parallelism in the algorithm and the performance criteria set for the system; the types of computation elements needed to efficiently implement the algorithm; the number of computation elements needed to efficiently implement the user code; the pipeline organization in terms of the number of stages, the instruction issue rate, the scalarity, the number of computation elements in terms of the number of adders, load, store units, among others, and the placement of the computation elements in the pipeline structure; the width of the ALUs (computation elements); the number of register files and their configuration in terms of the number of registers, their widths, the number of read ports and write ports; the need for condition code registers; the need for and the amount of instruction cache, and data cache needed, and their hierarchy; the caching mechanism separately for the Instruction Cache and Data Cache, the line sizes, and the cache spill and fill algorithms. The system can automatically introduce Instruction and Data prefetch instructions in the code of the user's algorithm, to do prefetch on demand and at the right time. The system can determine the write back policies of each of the caches; the number of read and write ports to memory, and the bus widths between the caches and the memory; the levels of cache, and its organization in terms of shared/separate Instruction and Data, or a combined cache, or its organization into multiple levels, to reduce the overall cost structure, yet maintain high performance; or the memory hierarchy in terms of the memory size, the memory map scheme, the access size, the number of read/write ports and their widths, and how the memory needs to be split up to get the maximum performance. The system can automatically determine the ISA for the machine to implement the algorithm in an efficient manner. The system can automatically determine an optimal encoding for the instruction set, to take the least amount of code space, yet achieve high performance. The system can automatically determine the calling conventions that ensure the optimal usage of the available registers. All this done iteratively, in a hierarchical manner will determine the optimal overall system architecture to come up with a chip that is optimized for the applications at hand, satisfying the given timing, cost, and power requirements.

Other implementations can include the following. The system can optimize processor scalarity and instruction grouping rules. The system can also optimize the number of cores needed and automatically splits the instruction stream to use the cores effectively. The processor architecture optimization includes changing an instruction set. The system's changing an instruction set includes reducing the number of instructions required, coming up with new instructions, and encoding the instructions to improve instruction access, decode speed and instruction memory size requirements. The processor architecture optimization includes changing one or more of: a register file port, port width, and number of ports to data memory. The processor architecture optimization includes changing one or more of: data memory size, data cache pre-fetch policy, data cache configuration, Instruction memory size, instruction cache pre-fetch policy and instruction cache configuration. The processor architecture optimization includes adding one or more co-processors. The system can automatically generate a new instructions uniquely customized to the computer readable code to improve performance of the processor architecture for the algorithm. The system includes parsing the computer readable code, and further includes introducing zero overhead loop operations; identifying required memory bandwidth; replacing one or more software implemented flags as one or more hardware flags. The extracting parameters further includes determining an execution cycle time for each loop; determining an execution clock cycle count for each loop; determining clock cycle count for one or more bins; generating an operator statistic table; generating statistics for each function; and sorting lines by descending order of execution count. The system can mold commonly used instructions into one or more groups and generating a custom instruction for each group to improve performance (instruction molding). The system can determine timing and area costs for the architecture parameter change. Sequences in the program that could be replaced with the new molded instructions are identified. This includes the ability to rearrange instructions within a sequence to maximize the fit without compromising the functionality of the code. The system can track pointer marching and building statistics regarding stride and memory access patterns and memory dependency to optimize cache pre-fetching and a cache organization.

The system also includes performing static profiling of the computer readable code and dynamic profiling of the computer readable code. A system chip specification is designed based on the profiles of the computer readable code. The chip specification can be further optimized incrementally based on static and dynamic profiling of the computer readable code. The computer readable code can be compiled into optimal assembly code, which is assembled and linked to generate firmware for the selected architecture. A simulator can perform cycle accurate simulation of the firmware. The system can perform dynamic profiling of the firmware. The method includes optimizing the chip specification further based on profiled firmware or based on the assembly code. The system can automatically generate register transfer level (RTL) code for the designed chip specification. The system can also perform synthesis of the RTL code to fabricate silicon.

Advantages of the preferred embodiments may include one or more of the following. The system significantly reduces the turn-around time and the design cost for development of ASICs and ASIPs. This is done by exploiting the application written in "C" with the underlying algorithm in mind, rather than any particular "chip" design. The system then automatically generates a processor based chip design to implement the algorithm, along with the requisite Software Development Kit and firmware that runs on the chip. The process takes a few weeks to come up with a design, vs. several man years of effort for an ASIP/ASIC.

The system can automatically generate a chip design to match the application's requirements by relying on an "Architecture Optimizer" (AO). Based on the algorithm's execution profile obtained from a cycle accurate system level simulator, and the static profile of the algorithm, and the characterization of the various hardware blocks that go into the chip, the AO determines an optimum hardware configuration that would satisfy the vendor requirements of performance, power, and cost. Based upon an analysis of the algorithm, the AO comes up with a proposed chip architecture that would satisfy the performance requirements, as well as optimize the hardware to the algorithm at hand. The AO comes up with an optimal architecture in a series of iterative steps it takes, to converge upon an optimal hardware for the given algorithm.

The AO determines the optimal architecture for a given algorithm based on a series of hierarchical decisions it makes on various aspects of the ASIP, to match the vendor criteria, so the AO is not stuck in achieving a local minimal architecture, which is not a global minimal architecture.

The system automates the evaluation process so that all costs are taken into consideration and system designer gets the best possible number representation and bit width candidates to evaluate. The method can evaluate the area, timing and power cost of a given architecture in a quick and automated fashion. This methodology is used as a cost computing engine. The method enables the synthesis of the DSP automatically based on the algorithm in an optimal fashion. The system designer does not need to be aware of the hardware area, delay and power cost associated with the choice of a particular representation over another one. The system allows hardware area, delay and power to be modeled as accurately as possible at the algorithm evaluation stage.

Other advantages of the preferred embodiments of the system may include one or more of the following. The system alleviates the problems of chip design and makes it a simple process. The embodiments shift the focus of product development process back from the hardware implementation process back to product specification and computer readable code or algorithm design. Instead of being tied down to specific hardware choices, the computer readable code or algorithm can be implemented on a processor that is optimized specifically for that application. The preferred embodiment generates an optimized processor automatically along with all the associated software tools and firmware applications. This process can be done in a matter of days instead of years as is conventional. The described automatic system removes the risk and makes chip design an automatic process so that the algorithm designers themselves can directly make the hardware chip without any chip design knowledge since the primary input to the system is the computer readable code, model or algorithm specification rather than low level primitives.

Yet other benefits of using the system may include

1) Speed: If chip design cycles become measured in weeks instead of years, the companies using the system can penetrate rapidly changing markets by bringing their products quickly to the market.
2) Cost: The numerous engineers that are usually needed to be employed to implement chips are made redundant. This brings about tremendous cost savings to the companies using the instant system.

3) Optimality: The chips designed using the instant system product have superior performance, area and power consumption.

The instant system is a complete shift in paradigm in methodology used in design of systems that have a digital chip component to it. The system is a completely automated software product that generates digital hardware from algorithms described in C/Matlab. The system uses a unique approach to the process of taking a high level language such as C or Matlab to realizable hardware chip. In a nutshell, it makes chip design a completely automated software process.

DESCRIPTION

Figure 1:
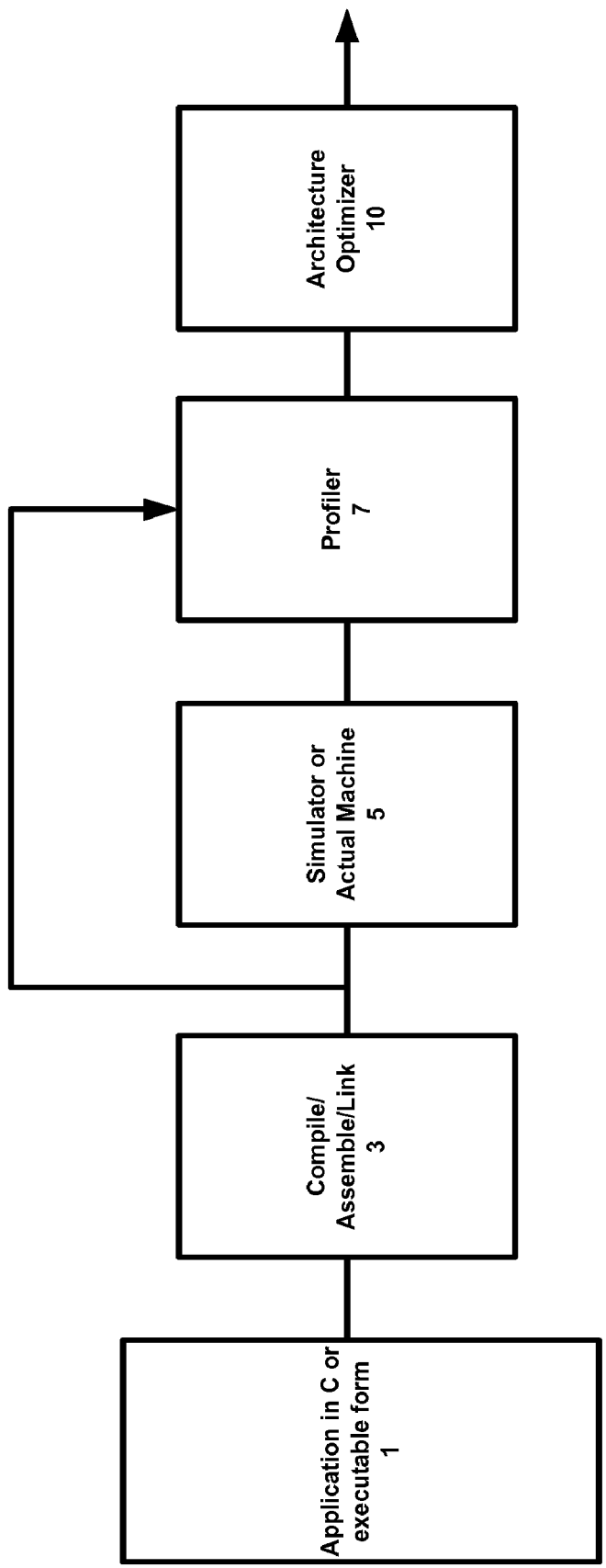
FIG. 1 shows an exemplary system to automatically determine the best architecture for a custom IC or ASIC device whose functionality is specified by a program, code or computer model.

FIG. 1 shows an exemplary system to automatically determine the best architecture for a custom IC or ASIC device whose functionality is specified by a program, code or computer model. Different stages involved in obtaining architecture definition for a given computer readable code or program provided as input (1). In one embodiment, the program is written in the C-language, but other languages such as Matlab, C++, or Java can be used as well. The program is compiled, assembled and linked (3). The executable code is run on a simulator or actual computer (5). Traces from the execution are provided to a profiler (7). The information generated by the profiler includes call graphs for static execution and dynamic execution, code execution profile, register allocation information, and current architecture, among others, and the information is provided to an architecture optimizer (AO) (10). The output of the architecture optimizer is an architectural specification that includes pipeline information, compiler calling conventions, register files, cache organization, memory organization, and instruction set architecture (ISA) and instruction set encoding information, among others.

The AO generates a chip design to match the application's requirements. Based on the algorithm's execution profile it gets from a cycle accurate system level simulator, and the static profile of the algorithm, and the characterization of the various hardware blocks that go into the chip, the AO determines an optimum hardware configuration that would satisfy the vendor requirements of performance, power, and cost. Based upon an analysis of the algorithm, the AO proposes a chip architecture that would satisfy the performance requirements, as well as optimize the hardware to the algorithm at hand. The AO comes up with an optimal architecture in a series of iterative steps that converge upon an optimal hardware for a given algorithm.

The AO determines the optimal architecture for a given algorithm based on a series of hierarchical decisions it makes on various aspects of the ASIP, to match the vendor criteria, so that at no point does it get stuck in achieving a locally minimal architecture. Rather, the AO can design a globally minimal architecture.

For the AO to avoid being stuck in a local minima that results in missing the global minima during the architecture optimization process, the AO performs the architecture optimization in a hierarchical manner. In one implementation of the hierarchical optimization process, the AO first determines the pipeline layout and the number of computation elements needed to optimally map the application kernels (loops) in an optimal way, to meet the user given constraints. Once that is done, the AO selects an optimal instruction set to meet the user given constraints, as well as matching the process requirements as dictated by a design modeler (DM). Next, the AO determines the register files and their organization, followed by cache organization, and then the memory organization. At each of these hierarchical check points, the AO determines the optimal organization of the respective components, at each point making sure the design is within the hardware process constraints as given by the DM.

Figure 2:
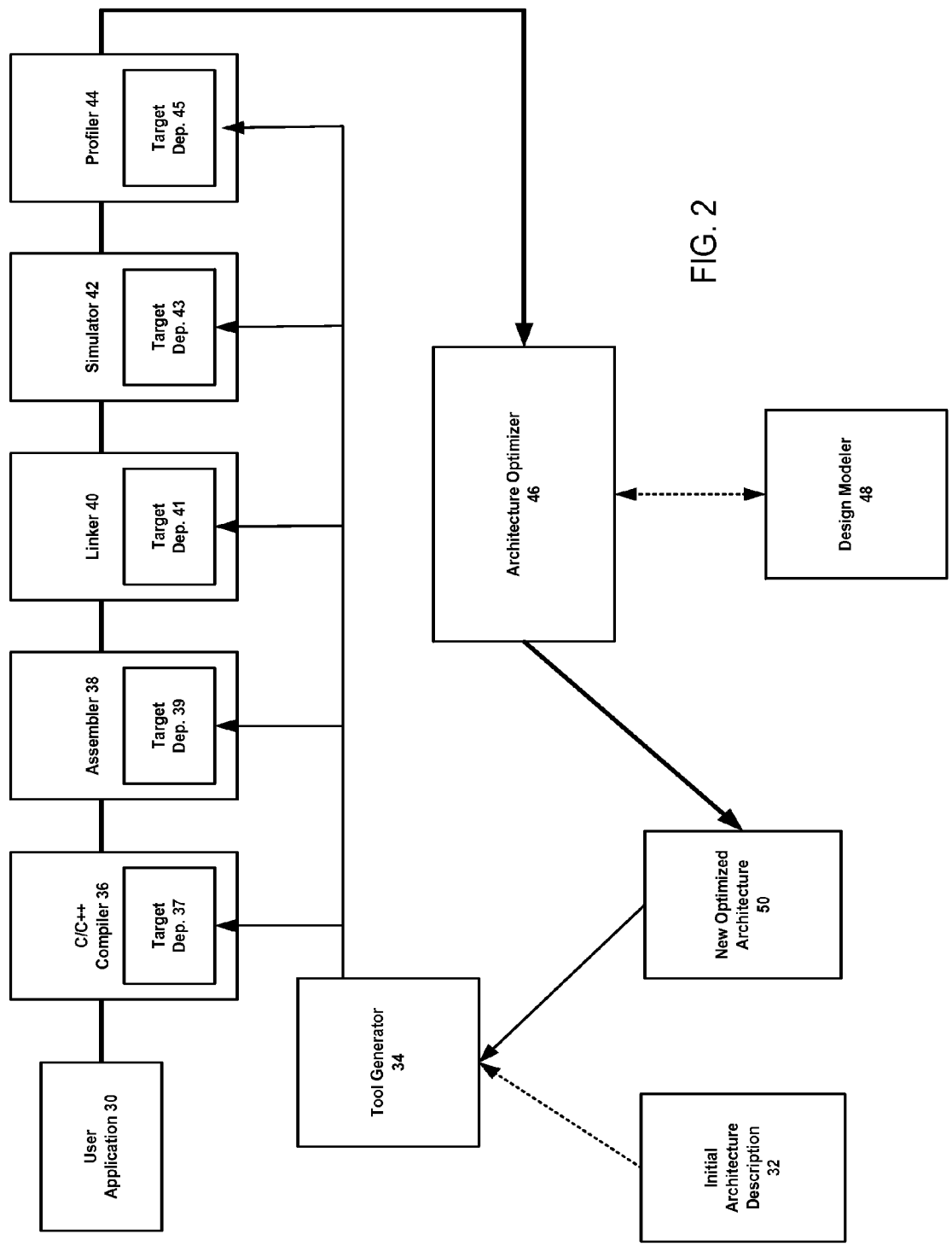
FIG. 2 shows an exemplary system for determining the optimal architecture with the architecture optimizer therein.

The AO can automatically generate an optimal computer architecture to fit a set of algorithms based on the execution profile of the given algorithms. FIG. 2 shows an exemplary system for determining the optimal architecture with the architecture optimizer therein.

In FIG. 2, a user application 30 is provided as an input. Additionally, an initial architecture description 32 is specified. The architecture description is processed by a tool generator 34 which generates target dependent information for a compiler 36 with target dependencies 37, an assembler 38 with target dependencies 39, a linker 40 with target dependencies 41, a simulator 42 with target dependencies 43, and a profiler 44 with target dependencies 45. Based on the target dependent information, a profile of the user application 30 is generated. The profile identifies critical routines and their kernels (most executed loops). The profile also identifies memory traffic patterns. The profile is provided to an architecture optimizer 46. The architecture optimizer 46 also uses inputs from a design data modeler 48. The design modeler 48 provides timing, area, power, and other relevant information for a particular hardware, and such information can be queried by the architecture optimizer 46 on demand. The output of the optimizer 46 is a new optimized architecture 50. The optimized architecture 50 is then provided to the tool generator 34 for iterative optimization of the architecture until a predetermined optimization goal is reached.

The new architecture is obtained by optimizing each of the components in the architecture, and their overall interconnections. For a given set of applications/algorithms, an optimal computer system architecture can automatically be determined based on the various factors like performance, cost, and power. The optimal architecture can include a system level architecture and a processor level architecture. For the system level architecture, the AO can automatically determine the amount of memory needed, the memory bandwidth to support, the number of DMA channels, clocks, and peripherals, for example. For processor level architecture, the AO can automatically determine: the need for and the amount of scalarity of the computation elements based on the parallelism in the algorithm and the performance criteria set for the system; the types of computation elements needed to efficiently implement a particular algorithm; the number of computation elements needed to efficiently implement the application; the pipeline organization in terms of the number of stages, the instruction issue rate, the scalarity, the number of computation elements in terms of the number of adders, load, store units, etc. and the placement of the computation elements in the pipeline structure; the width of the ALUs (computation elements); the number of register files and their configuration in terms of the number of registers, their widths, the number of read ports and write ports; the need for condition code registers; the need for and the amount of instruction cache, and data cache needed, and their hierarchy; the caching mechanism separately for the instruction cache and data cache, the line sizes, the cache spill and fill algorithms.

The AO can automatically enable introduction of instruction and data prefetch instructions in the code of the user's algorithm, to do prefetch on demand and at the right time. The AO can determine the write back policies of each of the caches; the number of read and write ports to memory; the bus widths between the caches and the memory; and the levels of cache, and its organization in terms of shared or separate instruction and data caches, or a combined cache, or its organization into multiple levels, to reduce the overall cost structure, yet maintain high performance.

The AO can automatically determine memory hierarchy in terms of the memory size, the memory map scheme, the access size, the number of read/write ports and their widths, and how the memory needs to be split up to get the maximum performance. The AO can automatically determine the ISA for the machine to implement the algorithm in an efficient manner, and further automatically determine an optimal encoding for the instruction set, to take the least amount of code space, yet achieve high performance. The AO can also automatically determine the calling conventions that ensure the optimal usage of the available registers.

The foregoing operations can be done iteratively and in a hierarchical fashion to determine the optimal overall system architecture to come up with a chip that is optimized for the application 30, satisfying the given timing, cost, and power requirements.

Next, the determination of pipeline and scalarity characteristics of a particular architecture by the AO is discussed. Given a code or an algorithm in C or any other form that can be compiled, the code can be executed. Upon execution, its execution profile is obtained. Based on the execution profile, critical computation regions/blocks are determined by taking into account the regions of code that take up 80% to 90% of the execution time (based on the execution profile), for example. The computations that make up these identified computation blocks are modeled and based on the estimated performance, and the parallelism in the computations involved, a pipeline layout along with the number of parallel execution pipes is determined, all in constant consultation with the data modeler (DM). This modeling determines the clock frequency of the processor along the the number of number of parallel pipes of execution, either organized as a super-scalar or a VLIW execution engine.

Turning now to the ISA, with the modeling of the execution pipe done, the AO reduces the critical paths in the identified critical computation regions, based on the 80% to 90% execution profile. New instructions are created to reduce the critical paths again in constant consultation with the DM on the timing, area, and power for the hardware blocks that execute these new instructions. These computation blocks sometimes could encompass a whole C-function and more.

Next, one exemplary compiler calling convention determined by the AO is discussed. Exemplary compiler calling conventions for a processor can include
 call stack layout,
 a number of registers dedicated to passing parameters,
 a certain number of registers used to hold values that are live across calls (callee saved registers)
 a certain number of registers used to hold values that are not live across a call (caller saved registers)
In order to determine an optimal calling convention for a given set of applications, the AO bases its decision on the static call graph, and the dynamic calls and behavior of its constituent routines. Based on the number of times a routine is called, it is given a certain weight, and the number of parameters passed to the routine also gets the same weight. All routines that make up the highest predetermined percentage of the execution time are considered in our algorithm to determine the number of parameter registers. Once the number of parameter registers is determined, the AO then determines the number of caller-saved and callee-saved registers required. The consideration to reduce the number of caller saved registers is to reduce the execution time in the critical routines so that there is minimal register spill and fill code in the critical paths. This number is determined by the AO based on the data provided by a special register allocator which can do register allocation and determine the number of caller-saved and callee-saved registers to minimize the register spill and fill code as well as reduce the save and restore of the callee-saved registers, in a function's prolog and epilog respectively.

Next, the determination of the appropriate registers and register files is discussed. Once the calling conventions are determined, the number of parameter registers, caller saved, and callee-saved registers are known. Based on the needs to the critical regions of the original apps, the make-up of the register file(s) is determined, and the need for individual 1-bit flag registers is also determined, to finalize on the organization and make-up of the register files and the individual registers. The AO also determines the number of register read ports, write ports, and read-write ports for a given register file, based on the ISA that operates on the register file. The individual register widths are determined based on the application's requirements. The width of an individual register in a register file can be different from the width of the other registers in the register file.

Turning now to the cache determination, the cache is a high speed data access mechanism that bridges the mismatch between rate at which the user application needs to access data versus the rate at which the data can be supplied from the slower memory blocks. Based on the user application's need for data access rate, and the speed at which the data can be supplied from memory, the AO determines the need for Cache. If it is determined that the the user application requires a cache, the AO determines the configuration of the cache which could range from a simple buffer to a more sophisticated hierarchical multi-level cache mechanism. In either case, the AO determines the size of the cache line, number of lines, the degree of associativity of the cache, the cache line replacement policy, the prefetch policy (if any), and the write policy of the cache, again based on the performance in the critical regions of the algorithm. It also determines the number of read and write ports to the cache, and the bus widths between the caches and memory. It would also determine if there is a need for a separate instruction cache, and a data cache, or a combined cache, as the case may be.

Turning now to memory requirement, based on the application's needs, the AO determines the size of the memory, the memory access widths, and the number of read and write ports to the memory blocks. The AO also determines the bus widths to the memory block.

Next, the determination of the ISA and instruction set encoding by the AO is discussed. During the analysis of the algorithm, the AO determines the instruction set architecture that is relevant to the application at hand. It determines the ISA based on the operations involved, and the addressing modes that need to be supported to get an optimal ISA for the algorithm, and sizes of the immediate operands to be supported, and the modes the instruction need to support to implement the application on the processor. The AO removes any un-used modes and operand ranges that the user application never uses. These decisions are based on the static as well as dynamic profile of the application suite, among others. Additionally, the architecture optimizer generates an optimal encoding for the instruction set to minimize the code size. Depending upon the considerations, it would come up with either a fixed instruction length, or a dual instruction length, or a variable instruction length, whichever is appropriate to keep the code size low, and high performance.

Figure 3:
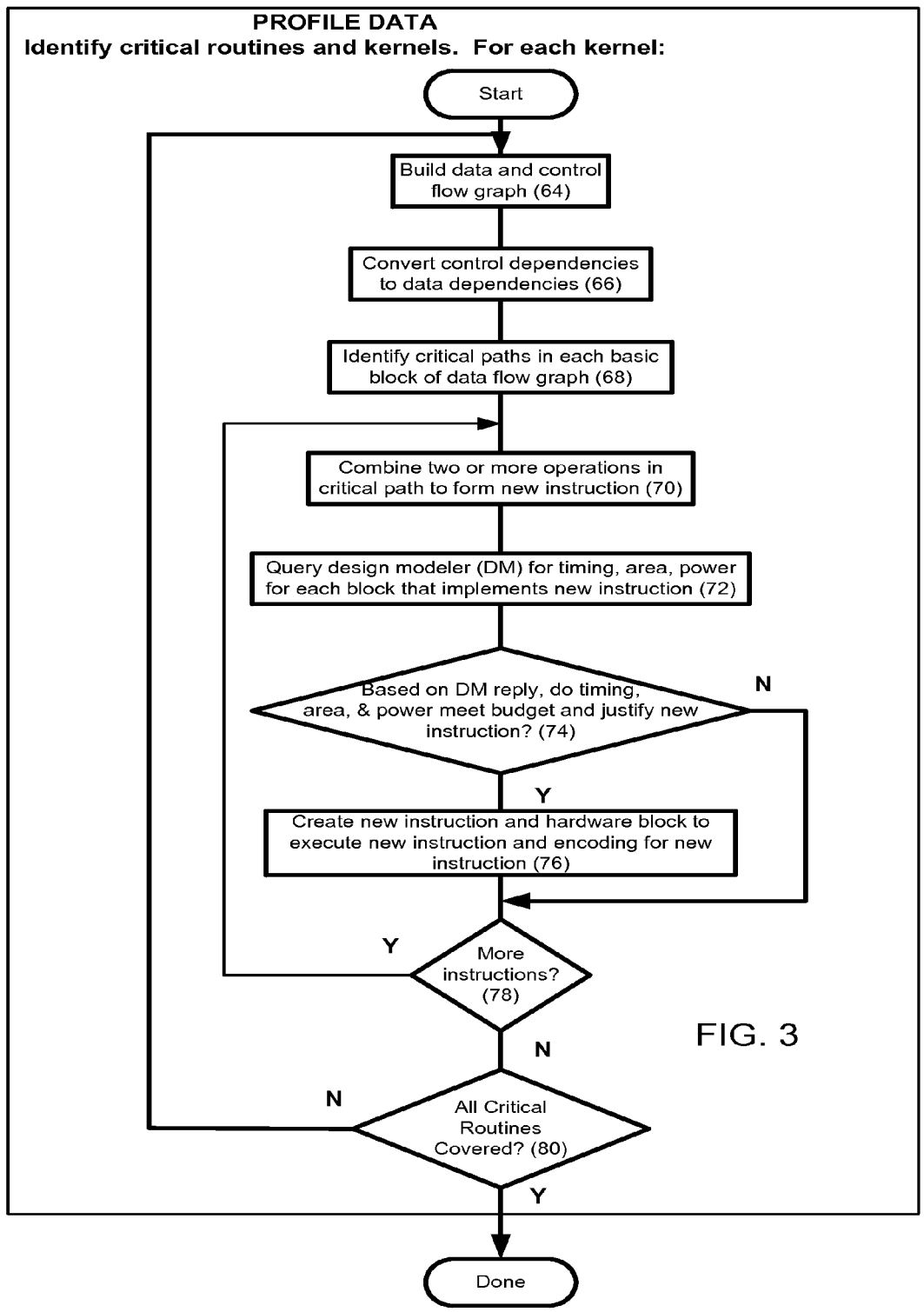
FIG. 3 shows an exemplary process to form new instructions.

FIG. 3 shows an exemplary process to form new instructions. The process of FIG. 3 obtains profiler data that identifies critical routines and kernels or loops that are executed in the user code. For each kernel, the process performs the following. First, the process builds a data flow graph and a control flow graph (64). Next, the process converts control dependencies to data dependencies if possible (66). The process then identifies critical paths in each basic block of data flow graph (68). The process then attempts to combine two or more operations in the critical path to form a potential new instruction to be added to the instruction set (70). The potential new instruction can then be implemented in hardware and allows the new architecture to be optimized to the user code. The process queries the design modeler (DM) for timing, area, and power, among other attributes, for a particular hardware block that implements the new instruction (72). From the DM response, the process checks if timing, area, power, and other factors meet the real estate and performance budget and if the savings are sufficient to create the new instruction (74). If not, the process skips to operation 78, and alternatively the process creates a new instruction with hardware and encoding scheme (76). Next, the process checks whether additional instructions are to be created (78). If so, the process loops back to (70) and if not, the process then checks if all critical routines have been examined/processed (80). If not, the process loops back to (64), and alternatively, the process exits.

In one implementation, using a pre-processor, the input program or user code is formatted before such program is analyzed by a parser. In the formatting process, functionality of the program is preserved. The parser initially uses a basic architecture to extract all the information and creates a database. The system then collects static and dynamic profiles of the program. From the output of the parser, parameters required for the architecture definition is extracted by a parameter extractor. With these parameters and the real time and hardware constraints to be met by the program as inputs, the system iteratively determines the most suitable architecture at the given stage for the given C-program. The architecture is used to parse the C-program and parameter extraction. A new architecture is defined again. This loop continues until the best architecture which gives the best time, area and power performance, is defined.

Once the real time performance constraints have been met, other hardware constraints are visited. The hardware constraints can be represented in terms of area, power and some other parameters. The algorithm then fine tunes the architecture to reduce redundant paths and non-critical sections to meet these constraints. Another algorithm is employed to check all the instructions available and verify the benefit provided by these instructions. A cost function is used to perform this check. All instructions that can be safely removed without impacting the real time performance constraints are removed from the set so that instruction decoding time is reduced to the minimal level. These constraints may or may not be met. They are used so that the architecture defined is not a big overkill for a given application and any scope for reducing the complexity of the architecture is investigated.

Figure 4:
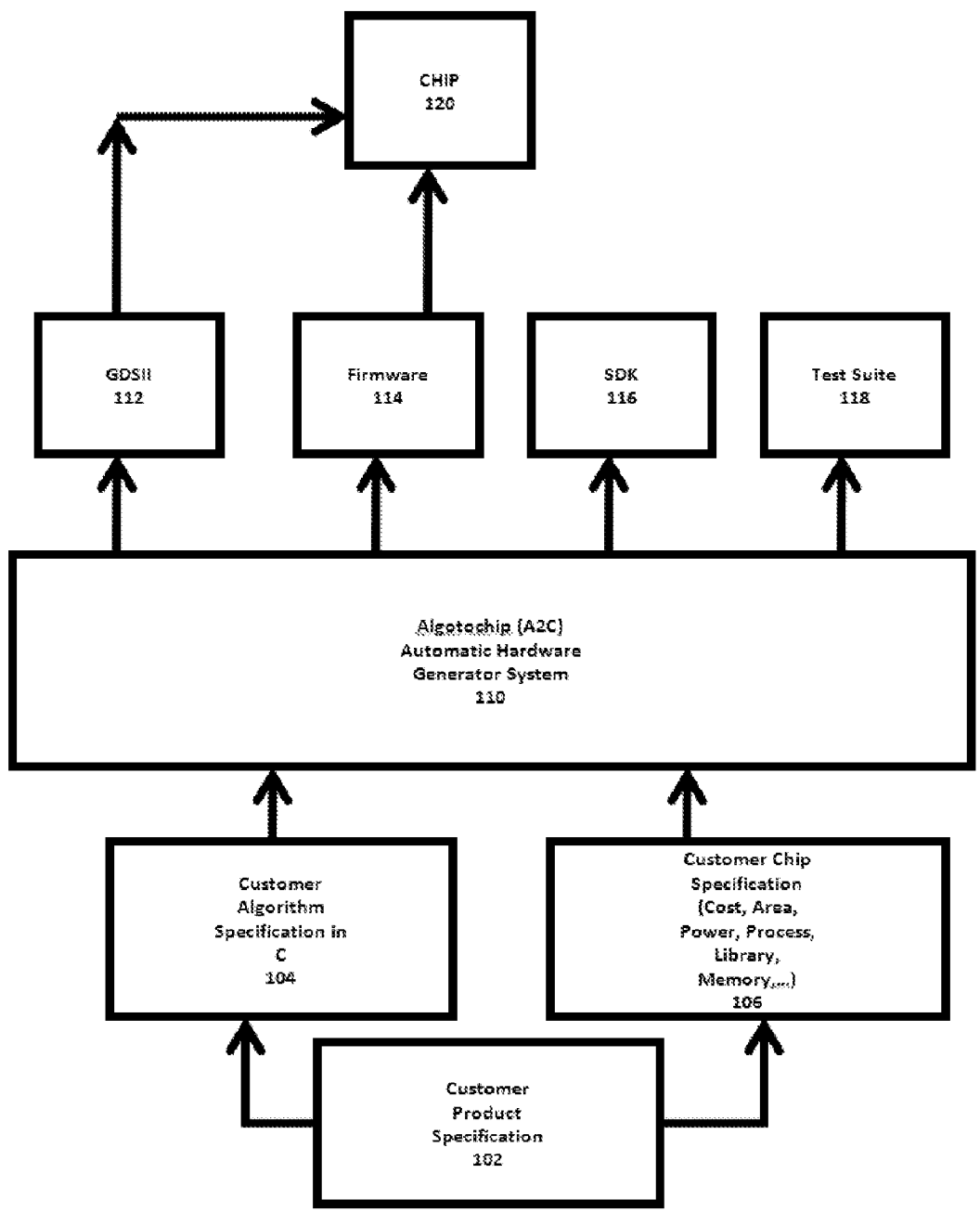
FIG. 4 shows an exemplary system to automatically generate a custom IC with the architecture defined by the architecture optimizer.

FIG. 4 shows an exemplary system 100 to automatically generate a custom IC. The system of FIG. 4 supports an automatic generation of an architecture for a custom hardware solution for the chosen target application. The target application specification is usually done through algorithm expressed as computer readable code in a high-level language like C, Matlab, SystemC, Fortran, Ada, or any other language. The specification includes the description of the target application and also one or more constraints such as the desired cost, area, power, speed, performance and other attributes of the hardware solution.

In FIG. 4, an IC customer generates a product specification 102. Typically there is an initial product specification that captures all the main functionality of a desired product. From the product, algorithm experts identify the computer readable code or algorithms that are needed for the product. Some of these algorithms might be available as IP from third parties or from standard development committees. Some of them have to be developed as part of the product development. In this manner, the product specification 102 is further detailed in a computer readable code or algorithm 104 that can be expressed as a program such as C program or a math model such as a Mathlab model, among others. The product specification 102 also contains requirements 106 such as cost, area, power, process type, library, and memory type, among others.

The computer readable code or algorithm 104 and requirement 106 are provided to an automated IC generator 110. Based only on the code or algorithm 104 and the constraints placed on the chip design, the IC generator 110 automatically generates with few or no human involvement an output that includes a GDS file 112, firmware 114 to run the IC, a software development kit (SDK) 116, and/or a test suite 118. The GDS file 112 and firmware 114 are used to fabricate a custom chip 120.

The instant system alleviates the issues of chip design and makes it a simple process. The system shifts the focus of product development process back from the hardware implementation process back to product specification and algorithm design. Instead of being tied down to specific hardware choices, the algorithm can always be implemented on a processor that is optimized specifically for that application. The system generates this optimized processor automatically along with all the associated software tools and firmware applications. This whole process can be done in a matter of days instead of years that it takes now. In a nutshell the system makes the digital chip design portion of the product development in to a black box.

In one embodiment, the instant system product can take as input the following:
 Computer readable code or algorithm defined in C/Matlab
 Peripherals required
 Area Target
 Power Target
 Margin Target (how much overhead to build in for future firmware updates and increases in complexity)
 Process Choice
 Standard Cell library Choice
 Testability scan The output of the system may be a digital hard macro along with all the associated firmware. A software development kit (SDK) optimized for the digital hard macro is also automatically generated so that future upgrades to firmware are implemented without having to change the processor.

The system performs automatic generation of the complete and optimal hardware solution for any chosen target application. While the common target applications are in the embedded applications space they are not necessarily restricted to that.

By way of example, a block diagram of a computer to support the automated chip design system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to automatically generate a processor architecture for a custom integrated circuit (IC) specified by a user code, the IC having at least one or more timing and hardware constraints, comprising:
   a. extracting parameters defining the processor architecture from a static profile and a dynamic profile of the user code, wherein extracting parameters further comprises:
      determining an execution cycle time for each instruction;
      determining an execution clock cycle count for each loop;
      generating an operator statistic table;
      generating statistics for each function; and
      sorting inner loops (kernels) by descending order of execution count;
   b. iteratively optimizing the processor architecture by changing one or more parameters of the processor architecture in a hierarchical manner until all timing and hardware constraints expressed as a cost function are met using an architecture optimizer (AO) and a compiler-in-the-loop to compile, assemble and link code for each processor architecture iteration to arrive at a customized architecture with an application specific instruction set;
   c. synthesizing the customized processor architecture into a computer readable description of the custom integrated circuit for semiconductor fabrication; and
   d. changing the processor instruction set by automatically generating new instructions uniquely customized to the computer readable code to improve performance of the processor architecture, further including:
      identifying required memory bandwidth;
      replacing one or more software implemented flags as one or more hardware flags; and
      combining two or more operations into a new instruction.

2. The method of claim 1, comprising automatically determining an optimal computer system architecture based on predetermined criteria including performance, cost, and power.

3. The method of claim 1, comprising automatically determining a processor level architecture with one or more types of computation elements needed to efficiently implement the user code.

4. The method of claim 1, comprising automatically determining a processor level architecture with the number of computation elements needed to efficiently implement the user code.

5. The method of claim 1, comprising automatically determining a processor level architecture with a number of register files and a register configuration including a number of registers, register widths, read ports, and write ports.

6. The method of claim 1, comprising automatically determining a processor level architecture with condition code registers.

7. The method of claim 1, comprising automatically determining a processor level architecture with instruction cache, data cache, and cache hierarchy.

8. The method of claim 1, comprising automatically determining a processor level architecture with caching mechanism separately for the instruction cache and data cache, the line sizes, the spill and fill algorithms.

9. The method of claim 1, comprising automatically determining a processor level architecture with write back policies for each cache.

10. The method of claim 1, comprising automatically determining a processor level architecture with a number of read and write ports to memory, and bus widths between caches and memory.

11. The method of claim 1, comprising automatically determining a processor level architecture with levels of cache, and organization including shared or separate instruction cache and data cache, or a combined cache.

12. The method of claim 1, comprising automatically determining a processor level architecture with cache organization into multiple levels to reduce cost and maintain performance.

13. The method of claim 1, comprising automatically determining a processor level architecture with a memory hierarchy, with a memory size, a memory map scheme, an access size, a number of read/write ports and widths, and a memory organization.

14. The method of claim 1, comprising automatically determining a processor level architecture with an instruction set architecture (ISA) to implement the user code.

15. The method of claim 1, comprising automatically determining a processor level architecture with calling conventions to ensure optimal usage of available registers.

16. The method of claim 1, wherein the processor architecture optimization comprises changing an instruction set, including reducing the number of instructions required and encoding the instructions to improve instruction decode speed, and to improve instruction memory size requirement.

17. The method of claim 1, wherein the processor architecture optimization comprises changing one or more of: a register file port, port width, and number of ports to data memory.

18. The method of claim 1, wherein the processor architecture optimization comprises changing one or more of: data memory size, data cache pre-fetch policy, data cache replacement policy, instruction memory size, instruction cache pre-fetch policy, and instruction cache replacement policy.

* * * * *